UNITED STATES PATENT OFFICE 1,945,553

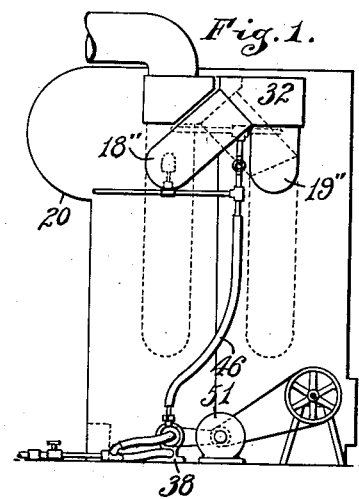

AIR CONDITIONING UNIT

Edmund H. Koon, Indianapolis, Ind.

Application July 30, 1932. Serial No. 626,547

2 Claims. (Cl. 62—139)

The object of my invention is to provide a simple, low cost, efficient air conditioning device which may be readily installed in dwellings.

The accompanying drawing illustrates my invention.

Fig. 1 is a side elevation;
Fig. 2 an end elevation;
Fig. 3 an end elevation opposite that of Fig. 2;
Fig. 4 a side elevation opposite that of Fig. 1;
Fig. 5 a plan;
Fig. 6 a section on line 6—6 of Fig. 2;
Fig. 7 a section on line 7—7 of Fig. 2;
Fig. 8 a section on line 8—8 of Fig. 2;
Fig. 9 a fragmentary section on line 9—9 of Fig. 2;
Fig. 10 a fragmentary elevation of one of the water curtain units;
Fig. 11 a perspective view of one series of reticulated elements for the water curtain unit, and
Fig. 12 a fragmentary section of one of the air passage walls.

Owing to the necessarily small scale of the drawing they are largely conventional in that no attempt has been made to indicate that the various walls are made of sheet metal secured together in the manner well-known to the sheet metal workers.

The apparatus comprises primarily a casing in which is formed a tortuous air passage 15 comprising (conveniently for the small size) three parallel connected legs A, B and C, separated by cooling chambers 18 and 19, the walls $w$ of which are formed of corrugated metal in order to provide a maximum exposed surface. The inlet to the tortuous air passage is preferably a fine screen 20 and the delivery end of this passage (lower end of leg C) delivers into a fan casing 21, the delivery mouth of which connects with a duct leading to the rooms the air of which is to be conditioned. Preferably this duct includes the air heating chamber of a heating furnace for reasons which will appear.

Arranged in the inlet end of the passage 15 is a spray nozzle 25 by means of which the air passing through passage 15 may be humidified to a desired extent.

Leading into the lower ends of the cooling chambers 18 and 19 are air inlet ducts 18' and 19' respectively (Fig. 4), connected at their upper ends to a suitable header 30 which is supplied by a pipe 31 leading to any desired point outside of the building.

Leading from the upper ends of the chambers 18 and 19, preferably diagonally opposite from the inlet ducts are discharge ducts 18" and 19" respectively, connected by a header 32, the discharge end of which may be led to a point outside of the house. Chamber 19 drains, through a pipe 35, into chamber 18, and chamber 18 drains through pipe 36 into the bottom of the main casing, as indicated at 37 (Fig. 7), which forms a supply sump for the water pump 38 (Figs. 1 and 2).

In each of the cooling chambers 18 and 19, preferably at the mouth of the air inlet, a fan 40 is mounted capable of driving a blast of air inwardly and upwardly through the cooling chamber and in each of the cooling chambers near the bottom, I mount a drip frame 41 comprising a plurality of tiers of fine screen mesh, portions 42 of which may be flat, portions 43 downwardly troughed and portions 44 upwardly ridged. In the upper part of each chamber 18 and 19 is a spray nozzle 45 adapted to deliver a spray of water onto the drip frame 41. The discharge pipe 46 of pump 38 is connected to the several nozzles 25 and 45.

Mounted in the fan casing is an exhaust fan 50 and fan 50 and pump 38 are driven by a motor 51.

In order that the apparatus may be used as a supplement to a heating furnace in months when hot air is desired, I mount, between leg A and fan casing 21 a damper 60 which may be swung up to the position shown in Fig. 9 where it will block off the entry to the lower end of leg B and thus afford direct communication between leg A and the fan casing. The damper 60 may be manipulated by a cord 61 passed out of the casing at 62 (Fig. 7) and provided with a handle by which it may be readily manipulated.

It will be readily understood that the structure described will be most conveniently made in at least two sections, divided say on line X—X of Fig. 7 so that, if greater capacity is desired, intermediate sections may be interposed so as to increase the length of the tortuous passage 15 and correspondingly increase the number of cooling chambers.

The operation is as follows:

In the summer months when cooling effects are desired damper 60 will be in the position shown in Fig. 7. Air drawn in through header 30 by fans 40 will be delivered into the lower ends of the cooling chambers 18, 19 and forced upwardly through the water flowing from nozzles 45 and through the water dripping downwardly through the drip frames 41 and will be thereby cooled and driven outwardly through conduits 18" and 19".

The vertical walls of the chambers 18 and 19 will thus be cooled and consequently the air drawn through the tortuous passage 15 by fan 50 will be cooled. This air preferably will be simply circulated through the house, entering inlet 20 either directly from the cellar or from a conduit leading from an aperture in the floor of one of the lower rooms in the dwelling and being discharged through the usual register openings in the rooms.

Desired humidification may be accomplished by proper adjustment of the spray head 25.

In the cooler months when heating effects are desired the fans 40 will not be operated and damper 60 will be moved to the position shown in Fig. 9.

Air drawn into inlet 20 will thus pass directly from leg A to fan 50 and by that fan will be driven through the heating chamber of the furnace and thence to the room registers.

I claim as my invention:

1. Air conditioning apparatus comprising a tortuous air channel having an inlet and an outlet and comprising a plurality of intermediate laterally separated substantially vertical passages progressively connected at opposite ends, water-evaporating chambers interposed between adjacent walls of said vertical passages, and damper means interposed between said inlet and outlet and movable to establish tortuosity of air travel from inlet to outlet conjunctively relative to said evaporating chambers or to by-pass air travel from inlet to outlet relative to said evaporating chambers.

2. Air conditioning apparatus of the character specified in the preceding claim having in an evaporating chamber a nest of interlayered flat and oppositely arced screen sections, and a water discharge nozzle arranged above said nest, and means for establishing forced air travel from inlet to outlet.

EDMUND H. KOON.